US009477604B2

(12) United States Patent
Banavalikar et al.

(10) Patent No.: US 9,477,604 B2
(45) Date of Patent: *Oct. 25, 2016

(54) CACHING OF LOOK-UP RULES BASED ON FLOW HEURISTICS TO ENABLE HIGH SPEED LOOK-UP

(71) Applicant: Lenovo Enterprise Solutions (Singapore) Pte. Ltd., Singapore (SG)

(72) Inventors: Bhalachandra G. Banavalikar, Cupertino, CA (US); Keshav G. Kamble, Fremont, CA (US); Dar-Ren Leu, San Jose, CA (US); Vijoy A. Pandey, San Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,139

(22) Filed: Jul. 24, 2015

(65) Prior Publication Data
US 2015/0331801 A1    Nov. 19, 2015

Related U.S. Application Data

(63) Continuation of application No. 13/741,330, filed on Jan. 14, 2013, now Pat. No. 9,124,540.

(51) Int. Cl.
*G06F 15/167* (2006.01)
*G06F 12/08* (2016.01)
*H04L 12/747* (2013.01)

(52) U.S. Cl.
CPC ....... *G06F 12/0862* (2013.01); *G06F 12/0811* (2013.01); *G06F 12/0884* (2013.01); *H04L 45/742* (2013.01); *G06F 2212/283* (2013.01); *G06F 2212/602* (2013.01)

(58) Field of Classification Search
USPC ................................ 709/200, 203, 213, 239
See application file for complete search history.

(56) References Cited

U.S. PATENT DOCUMENTS 7,512,124 B2    3/2009  Sangroniz et al.
8,086,721 B2   12/2011  See et al.
(Continued)

FOREIGN PATENT DOCUMENTS

JP         2008131351 A      6/2008

OTHER PUBLICATIONS

Gopalan et al., "Improving Route Lookup Performance Using Network Processor Cache", 2002 ACM/IEEE conference on Supercomputing, Nov. 16-22, 2002, pp. 1-10.
(Continued)

*Primary Examiner* — El Hadji Sall
(74) *Attorney, Agent, or Firm* — Zilka-Kotab, PC

(57) ABSTRACT

In one embodiment, a computer program product includes a computer readable storage medium having computer readable program code embodied therewith, the computer readable program code including computer readable program code configured to initialize an internal look-up table cache provided internally to a switching processor, the internal look-up table cache being configured to store a plurality of look-up entries and being organized into at least three segments: a persistent flows entries segment, a non-persistent flows entries segment, and an access control list (ACL) segment. Each look-up entry relates to a traffic flow which has been or is anticipated to be received by a switching processor configured to access the internal look-up table cache. The computer readable program code is also configured to manage the internal look-up table cache to store entries relating to a particular segment type into a corresponding segment of the internal look-up table cache.

20 Claims, 5 Drawing Sheets

(56) References Cited

U.S. PATENT DOCUMENTS

| | | | |
|---|---|---|---|
| 8,621,154 B1* | 12/2013 | Goldschmidt | G06F 17/3033 707/827 |
| 9,124,540 B2 | 9/2015 | Banavalikar et al. | |
| 2006/0083248 A1 | 4/2006 | Huang et al. | |
| 2011/0228776 A1 | 9/2011 | Duncan et al. | |
| 2014/0201307 A1 | 7/2014 | Banavalikar et al. | |

OTHER PUBLICATIONS

IBM TDB, "New Caching Scheme for Routing Table Lookups", IP.com, Aug. 19, 2001, pp. 1-3.

Liao et al., "A new IP Lookup Cache for High Performance IP Routers", 47th ACM/IEEE Design Automation Conference, Jun. 13-18, 2010, pp. 338-343.

Liu, H., "Reducing Cache Miss Ratio for Routing Prefix Cache", IEEE Global Telecommunications Conference, Nov. 17-21, 2002, vol. 3, pp. 2323-2327.

Non-Final Office Action from U.S. Appl. No. 13/741,330, dated Nov. 6, 2014.

Notice of Allowance from U.S. Appl. No. 13/741,330, dated Jul. 24, 2015.

Singaraju et al., "FPGA based string matching for network processing applications", Microprocessors and Microsystems, vol. 32, Issue 4, Jun. 2008, pp. 210-222.

Banavalikar et al., U.S. Appl. No. 13/741,330, filed Jan. 14, 2013.

* cited by examiner

CACHING OF LOOK-UP RULES BASED ON FLOW HEURISTICS TO ENABLE HIGH SPEED LOOK-UP

RELATED APPLICATIONS

This application is a continuation of copending U.S. patent application Ser. No. 13/741,330, filed Jan. 14, 2013, which is herein incorporated by reference.

BACKGROUND

The present invention relates to data center infrastructure, and more particularly, this invention relates to high speed look-up using look-up rules cached based on flow heuristics.

Every network packet processor for Layer-2 and/or Layer-3 switches requires one or more look-up tables in order to discover a set of operations to be performed on the packets received from other devices in the network. Look-up tables hold specific information, such as IPv4 Routing Tables, IPv6 Routing Tables, Address Resolution Protocol (ARP) Tables, Media Access Control (MAC) Tables, Access Control List (ACL) Tables, Host Specific Routes Tables, etc. Scaling of such look-up tables is critical in order to allow for the scaling of packet processor chipsets used in devices which rely on these look-up tables. Larger Ternary Content-Addressable Memory (TCAM) banks may solve the problem of scaling the number of look-up entries or the size of the look-up table. However, one problem with this approach is that line rate look-up is complex to solve.

As the packet processor bandwidth increases, the look-up speed should increase similarly. For example, an Ethernet packet processor with 960 Gbps of switching bandwidth should have a successful look-up speed of 1440 Million successful searches per second (MSPS). As the packet processor adds more new features, the search process adds more numbers of parameters or tuples for the search, and thus the search becomes more complex. Switching processors, such as Application Specific Integrated Circuits (ASICs) have limits of on-chip look-up memories. As the look-up table size increases, the chip size, complexity, and size also needs to increase. Therefore, most of the highly scaled up switching ASICs provide external expansion of look-up tables. This necessitates more high speed TCAMs with wider and faster interface connectivity. However, this adds significant cost to the overall device employing the switching ASIC and also complicates board designs using such switching ASICs.

Accordingly, it would be beneficial to have a solution which enables high speed look-up without requiring extensive increases in the computing capacity of switching processors or more high speed TCAMs.

SUMMARY

In one embodiment, a system includes a switching processor. The switching processor includes a packet processor and an internal look-up table cache. The packet processor includes a look-up interface, fetch and refresh logic (LIFRL) module and a packet processor logic (PPL) module. The LIFRL module and the PPL module are configured to operate in parallel. Also, the internal look-up table cache includes a plurality of look-up entries, each look-up entry relating to a traffic flow which has been or is anticipated to be received by the switching processor. Furthermore, the LIFRL module is configured to access the internal look-up table cache and one or more external look-up tables.

In another embodiment, a system includes an internal look-up table cache and a LIFRL module. The internal look-up table cache includes a plurality of look-up entries, each look-up entry relating to a traffic flow which has been or is anticipated to be received by the system. Also, the LIFRL module is configured to access the internal look-up table cache and one or more external look-up tables.

In yet another embodiment, a computer program product includes a computer readable storage medium having computer readable program code embodied therewith. The embodied computer readable program code includes computer readable program code configured to initialize an internal look-up table cache provided internally to a switching processor. The internal look-up table cache is configured to store a plurality of look-up entries, and is organized into at least three segments: a persistent flows entries segment, a non-persistent flows entries segment, and an access control list (ACL) segment. Each look-up entry relates to a traffic flow which has been or is anticipated to be received by a switching processor configured to access the internal look-up table cache. The embodied computer readable program code also includes computer readable program code configured to manage the internal look-up table cache to store entries relating to a particular segment type into a corresponding segment of the internal look-up table cache.

Other aspects and embodiments of the present invention will become apparent from the following detailed description, which, when taken in conjunction with the drawings, illustrate by way of example the principles of the invention.

DETAILED DESCRIPTION

Figure 1:
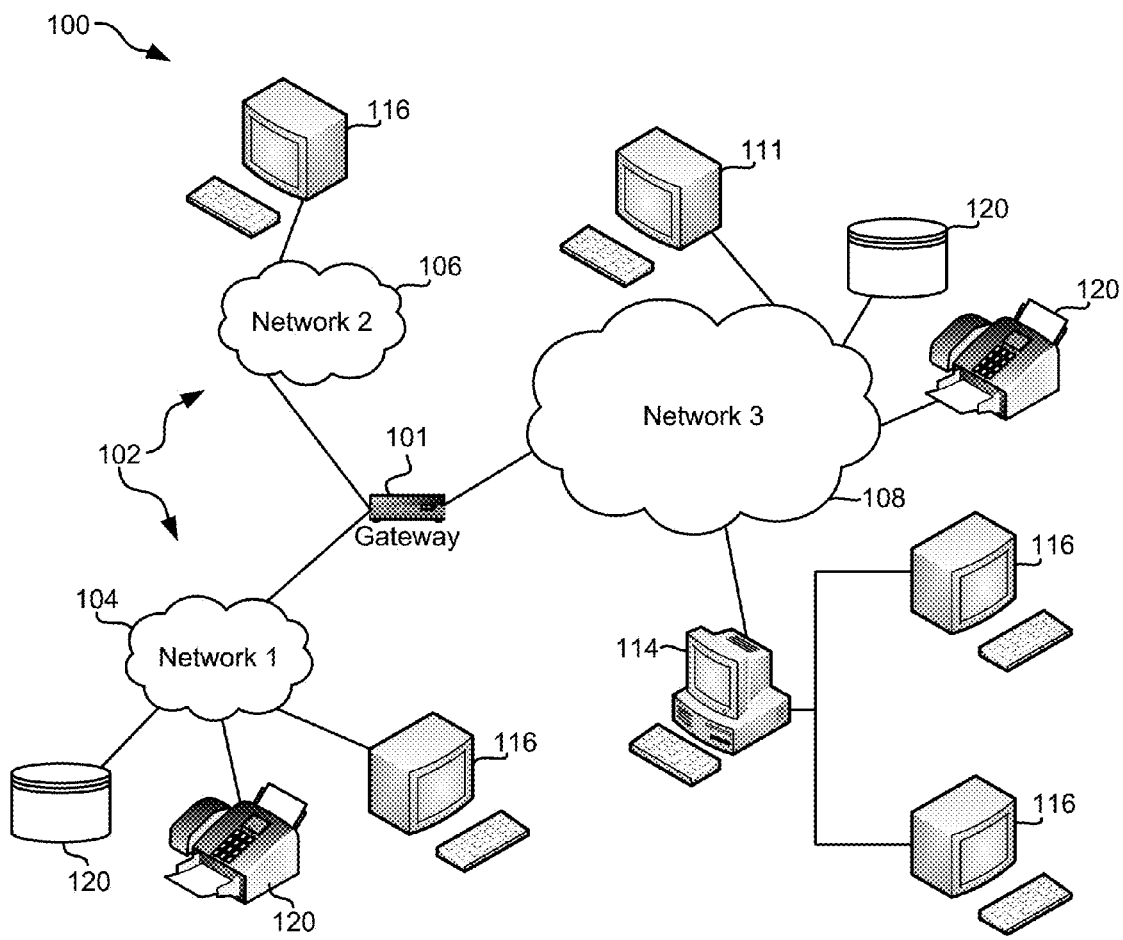
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a plurality of ports adapted for connecting to external devices and a switching processor. The switching processor includes a packet processor which includes a look-up interface, fetch and refresh logic (LIFRL) module and a packet processor logic (PPL) module adapted to operate in parallel, an internal look-up table cache including a plurality of look-up entries, each relating to a traffic flow which has been or is anticipated to be received by the switching processor, and a traffic manager module including a buffer memory which is connected to the plurality of ports. The LIFRL module is adapted for accessing the internal look-up table cache, the PPL module is adapted for communicating with the traffic manager module and the buffer memory, and the LIFRL module is adapted for communicating with one or more external look-up tables.

In another general embodiment, a method for using an internal look-up table includes storing a plurality of look-up entries to a look-up table cache provided internally to a switching processor, each look-up entry relating to a traffic flow which has been or is anticipated to be received, receiving a packet to forward, the packet adhering to a particular flow, performing look-ups on the internal look-up table cache to determine if any entries in the internal look-up table cache match the packet's particular flow, and forwarding the packet using information in a matching entry from the internal look-up table cache when a matching entry is found, otherwise forwarding the packet using information in an entry from one or more external look-up tables when a matching entry is not found in the internal look-up table cache.

In yet another general embodiment, a computer program product for using an internal look-up table includes a computer readable storage medium having computer readable program code embodied therewith, the computer readable program code including computer readable program code configured for storing a plurality of look-up entries to a look-up table cache provided internally to a switching processor, each look-up entry relating to a traffic flow which has been or is anticipated to be received, computer readable program code configured for receiving a packet to forward, the packet adhering to a particular flow, computer readable program code configured for performing look-ups on the internal look-up table cache to determine if any entries in the internal look-up table cache match the packet's particular flow, computer readable program code configured for forwarding the packet using information in a matching entry from the internal look-up table cache when a matching entry is found, and computer readable program code configured for forwarding the packet using information in an entry from one or more external look-up tables when a matching entry is not found in the internal look-up table cache.

According to another general embodiment, a switching processor implemented in hardware includes an internal look-up table cache including a plurality of look-up entries, each look-up entry relating to a traffic flow which has been or is anticipated to be received by the switching processor, a traffic manager module including a buffer memory, the traffic manager module being connected to a plurality of ports, and a packet processor having logic adapted for accessing the internal look-up table cache, logic adapted for communicating with the traffic manager module and the buffer memory, and logic adapted for communicating with one or more external look-up tables, wherein the internal look-up table cache is organized into at least three segments: a persistent flows entries segment, a non-persistent flows entries segment, and an access control list (ACL) segment, wherein each segment includes a plurality of entries relating to the segment type.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
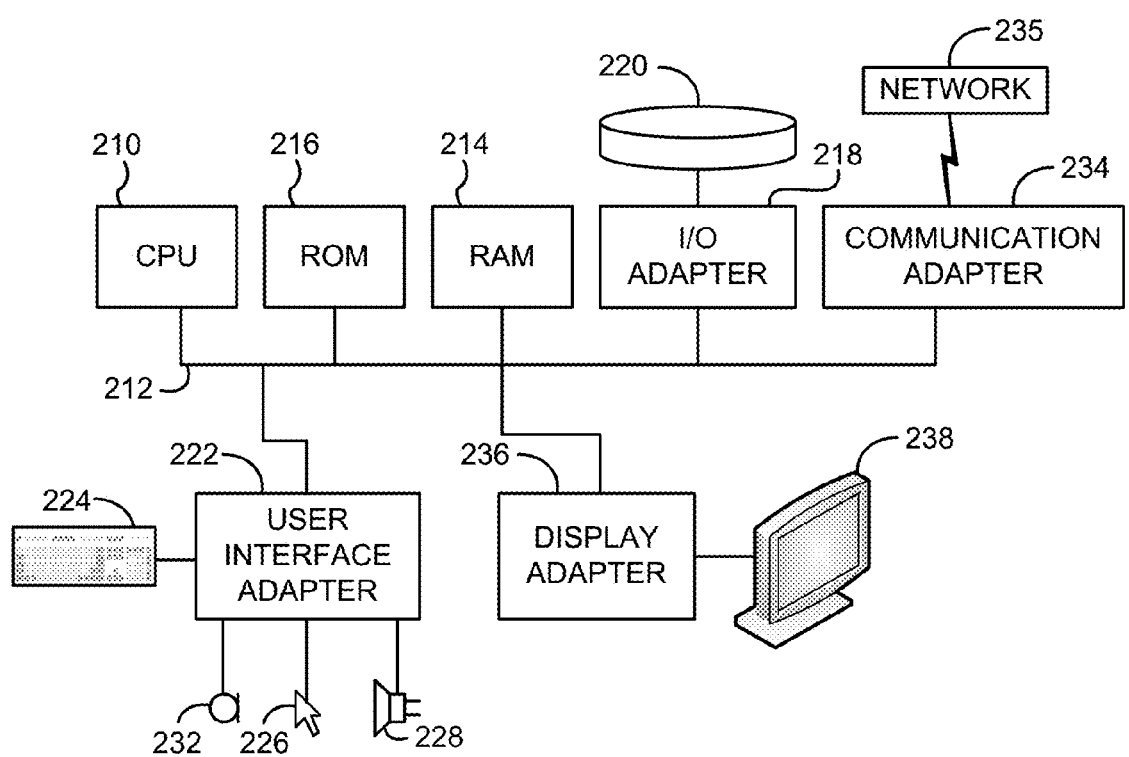
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

One approach described herein solves the problems of high speed look-up in network packet processors, such as switching Application Specific Integrated Circuits (ASICs), Field Programmable Gate Arrays (FPGAs), Central Processing Units (CPUs), etc. This solution is accomplished using look-up table caching, where a certain set of look-up entries are fetched and kept in high speed cache inside the packet processor. Since there are many ways to determine which look-up entries to fetch and store in cache, which to remove from cache, how often to refresh the set, etc., one or more algorithms may be used to make these determinations. In addition, the algorithmic selection of look-up entries may also depend upon the flow being processed.

Table 1 indicates relative speeds of look-up required to achieve various line rate packet switching in a packet processor (which may be a portion of a switching processor), according to some simple calculations.

TABLE 1

| Switch Bandwidth | Packets Per Second | Look-ups per second | Comments |
| --- | --- | --- | --- |
| 10 Gbps | 14.80 MPPS | 59.523 MSPS | 4 look-up banks, parallel search, packet size: 64 Bytes |
| 100 Gbps | 148.80 MPPS | 595.23 MSPS | 4 look-up banks, parallel search, packet size: 64 Bytes |
| 200 Gbps | 297.60 MPPS | 1190.4 MPPS | 4 look-up banks, parallel search, packet size: 64 Bytes |
| 960 Gbps | 1428.48 MPPS | 5713.92 MSPS | 4 look-up banks, parallel search, packet size: 64 Bytes |

As the switching bandwidth increases, from 10 gigabytes per second (Gbps) to 100 Gbps . . . to 960 Gbps, the look-up bandwidth also increases, from about 59 million searches per second (MSPS) to about 595 MSPS . . . to about 5714 MSPS. Such high speed look-up with wider look-up interfaces may be performed on-chip, according to embodiments presented herein. However, expanding the look-up table(s) on-chip is more difficult to achieve.

Analysis of the packet flows in a data center indicates that only a subset of look-up table entries is used over a finite amount of time (such as per second) for look-up purposes by the packet processor. The number of flows running through a switching device per second will usually be less than a total number of look-up entries supported by a highly scalable switching device.

For the purposes of these descriptions, when the term "look-up table" is used, any type of look-up table or look-up tables may be included, such as a Layer-2 forwarding database (FDB), IPv4 Routing Table, IPv6 Routing Table, Address Resolution Protocol (ARP) Table, Media Access Control (MAC) Table, Access Control List (ACL) Table, Host Specific Routes Table, etc.

The traffic flows through the switching device may be either short-lived or long-lived. Long-lived sessions are generally referred to as persistent flows and short-lived flows may be referred to as non-persistent flows.

Figure 3:
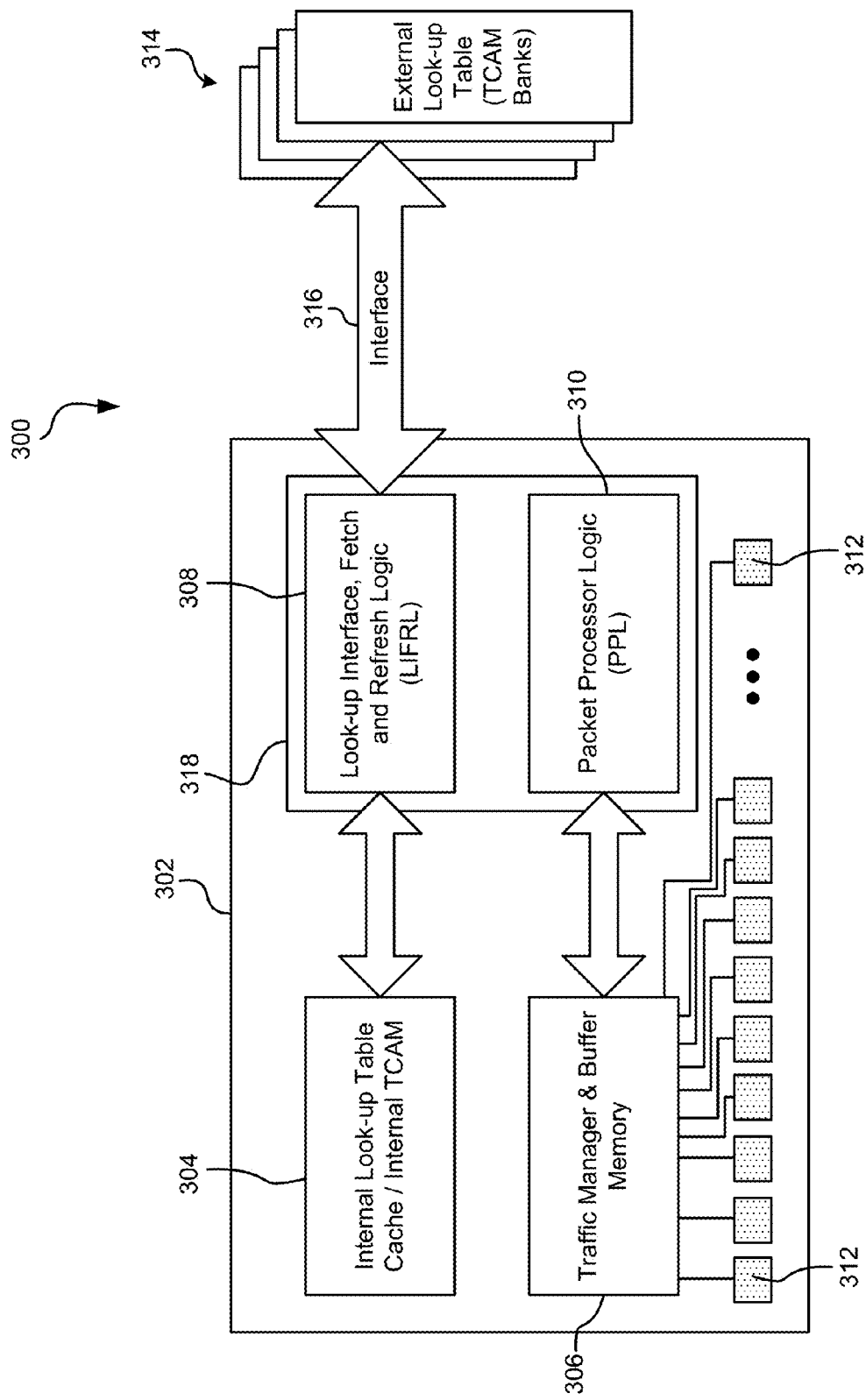
FIG. 3 is a simplified diagram of a switch system, according to one embodiment.

FIG. 3 is a simplified block diagram of a switch system 300, according to one embodiment. It shows the architecture of a packet processor 318 in communication with a simple Traffic Manager module 306 which includes Buffer Memory 320. The Traffic Manager module 306 is connected to a plurality of ports 312 adapted for connecting with external devices. The packet processor 318 includes a Look-up Interface, Fetch and Refresh Logic (LIFRL) module 308 that is adapted for interfacing with one or more external Look-up Tables 314, also referred to as Ternary Content-Addressable Memory (TCAM) banks. In conventional systems, the bottleneck which causes bandwidth issues is typically in the external look-up interface 316 between the LIFRL module 308 and the external Look-up Table(s) 314.

In order to solve the problem of look-up interface bandwidth, an internal Look-up Table Cache 304 may be used, according to embodiments described herein. The internal Look-up Table Cache 304 may be an internal memory cache or an on-chip (internal) TCAM memory which usually has high bandwidth interfaces internal to the switching processor 302 and accessible by the packet processor 318. Apart from this, the packet processor 318 also may use the external look-up interface 316 of a certain fixed bandwidth, which may also allow for look-ups to be performed on entries that are not cached internally in the internal Look-up Table Cache 304. The bandwidth of this external look-up interface 316 does not have to be as large as the switching bandwidth shown in Table 1 above due to the ability of the packet processor 318 to perform some look-up functionality using the internal Look-up Table Cache 304.

The packet processor 318 may include two functional blocks: a Packet Processor Logic (PPL) module 310, and the LIFRL module 308, as mentioned previously. Both functional blocks may be capable of processing completely in parallel with one another.

Now the PPL module 310 is discussed in more detail. Some functions of this block include (e.g., the block may include logic adapted for performing the following functions): performing pre-classification of packets in the Buffer Memory 320, creating one or more look-up requests, sending the one or more look-up requests to the look-up interface logic, receiving one or more look-up responses back, and processing a packet as per details included in the one or more look-up responses. For egress packets, the PPL module 310 may have functionality to perform egress packet processing for various functionalities, e.g. egress 802.1Q tagging, etc.

Now the LIFRL 308 is discussed in more detail. This block has access to both the internal Look-up Table Cache 304 and the one or more external look-up tables 314 (which may be TCAM-based in some embodiments).

The LIFRL 308, according to various embodiments, may have logic adapted for interacting with the PPL 310 for all look-up requests and responses, following a predefined format of the requests and responses, initializing and managing the Look-up Table Cache 304, following a preferred cache configuration provided by a local CPU (not shown), performing look-ups on the Look-up Table Cache 304 for packet forwarding decisions, handling cache misses and page faults, algorithmically bringing new blocks of look-up entries from the one or more external TCAM banks 314 into the Look-up Table Cache 304, and initializing and managing the one or more external TCAM banks 314. If it is deemed necessary, the LIFRL 308 may also perform pre-fetching operations in order to optimize performance of the switching processor 302. This may include grabbing entries from the one or more external TCAM banks 314 and having these entries ready to refresh in the internal Look-up Table Cache 304 in order to speed look-up operations performed by the LIFRL 308.

Managing the Look-up Table Cache 304 may include refreshing the entries stored in the Look-up Table Cache 304 according to some algorithmic calculation as to which entries would provide the greatest efficiency in operation of the switching processor 302, according to one embodiment.

According to one embodiment, a control pane of the network may be used to program internal and external TCAMs accessible to the system 300.

Figure 4:
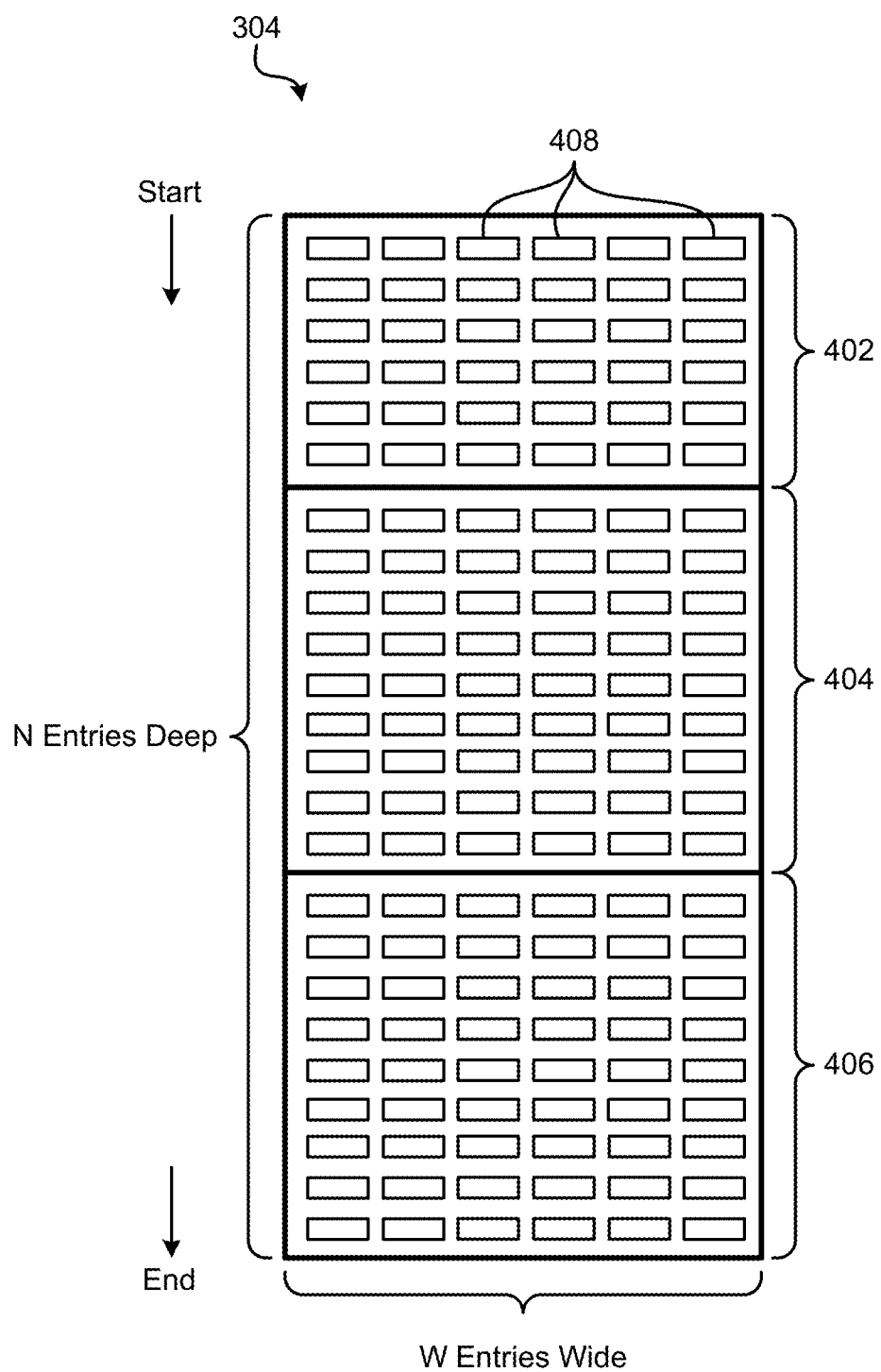
FIG. 4 is a simplified diagram of an internal look-up table cache, according to one embodiment.

The Look-up Table Cache 304 may have any or all of the following types of segments as shown in FIG. 4, according to one embodiment. Each segment may include a plurality of entries 408, each entry 408 relating to a traffic flow which has been or may be received by the switching processor.

A Persistent Flows Entries segment 402, where generally long lasting flows' look-up entries 408 may be stored, may be located at a more easily accessible portion of the Look-up Table Cache 304, in one embodiment. This segment may be refreshed with new entries 408 as and when new flows are received at the switching processor. Each entry 408 may have a timer and/or an activity bit associated therewith. If the entry 408 is idle for a certain predetermined or stipulated amount of time, as indicated by the associated timer, the entry 408 is eligible to be replaced with another suitable entry 408.

Exemplary persistent flows include, but are not limited to, VLAN records, port records, some ARP entries (such as static ARP entries), or any other entries classified as long term. Long term may indicate entries which will persist for about five seconds or more, in one approach. In other approaches, the length of persistency that defines persistent entries stored in the Persistent Flows Entries segment 402 may be determined based on activity received by the switching processor, and may be for time periods of more than about one second, more than about two seconds, more than about three seconds, etc.

A Non-Persistent Flows Entries segment 404, where short term flows' look-up entries 408 may be stored, may be located at a portion of the Look-up Table Cache 304 separate from the Persistent Flows Entries segment 402, in one embodiment. The Non-Persistent Flows Entries segment 404 may be relatively larger (has more storage space) than the Non-Persistent Flows Entries segment 404 to accommodate more entries 408 in order to maximize the chances of finding a match when analyzing flows.

Exemplary non-persistent flows include, but are not limited to, dynamic ARP entries, host movements, multicast domain channel surfing, etc. Non-persistent flows may be those used for only short periods of time, or those that are only intended to be used once or a few times before being removed from the Look-up Table Cache 304.

An ACL segment 406, where all the ACL entries may reside, may be located at a portion of the Look-up Table Cache 304 deeper than the Non-Persistent Flows Entries segment 404 and the Persistent Flows Entries segment 402, in one embodiment. The entries in the ACL segment 406 may be loaded at start-up time and may or may not be replaced during the course of use of the Look-up Table Cache 304. Generally, the entries 408 located in the Look-up Table Cache 304 may be accessed for every packet received by the switching processor.

In some embodiments, an internal look-up table that normally exists in switching processors may be replaced with the Look-up Table Cache 304, which may be N bits deep by W bits wide (N×W), as shown in FIG. 4. Furthermore, in one embodiment, the Look-up Table Cache 304 may be set-up such that the width (W) of the Look-up Table Cache 304 matches a largest record size for whatever system, record protocol, storage protocol, etc., the Look-up Table Cache 304 is being used with.

Entries 408 in any portion of the Look-up Table Cache 304 may be removed during use of the Look-up Table Cache 304. This cache entry age-out may occur by one or more of the following ways: timer expiry for an individual entry 408, idle activity over a predetermined amount of time for an individual entry 408, artificially according to logic which determines to reload the Look-up Table Cache 304 with fresh entries such as due to updates being made in the external look-up table, and/or look-up faults or misses occurring more often than is acceptable which may cause the entry 408 to be fetched from the external TCAM.

Figure 5:
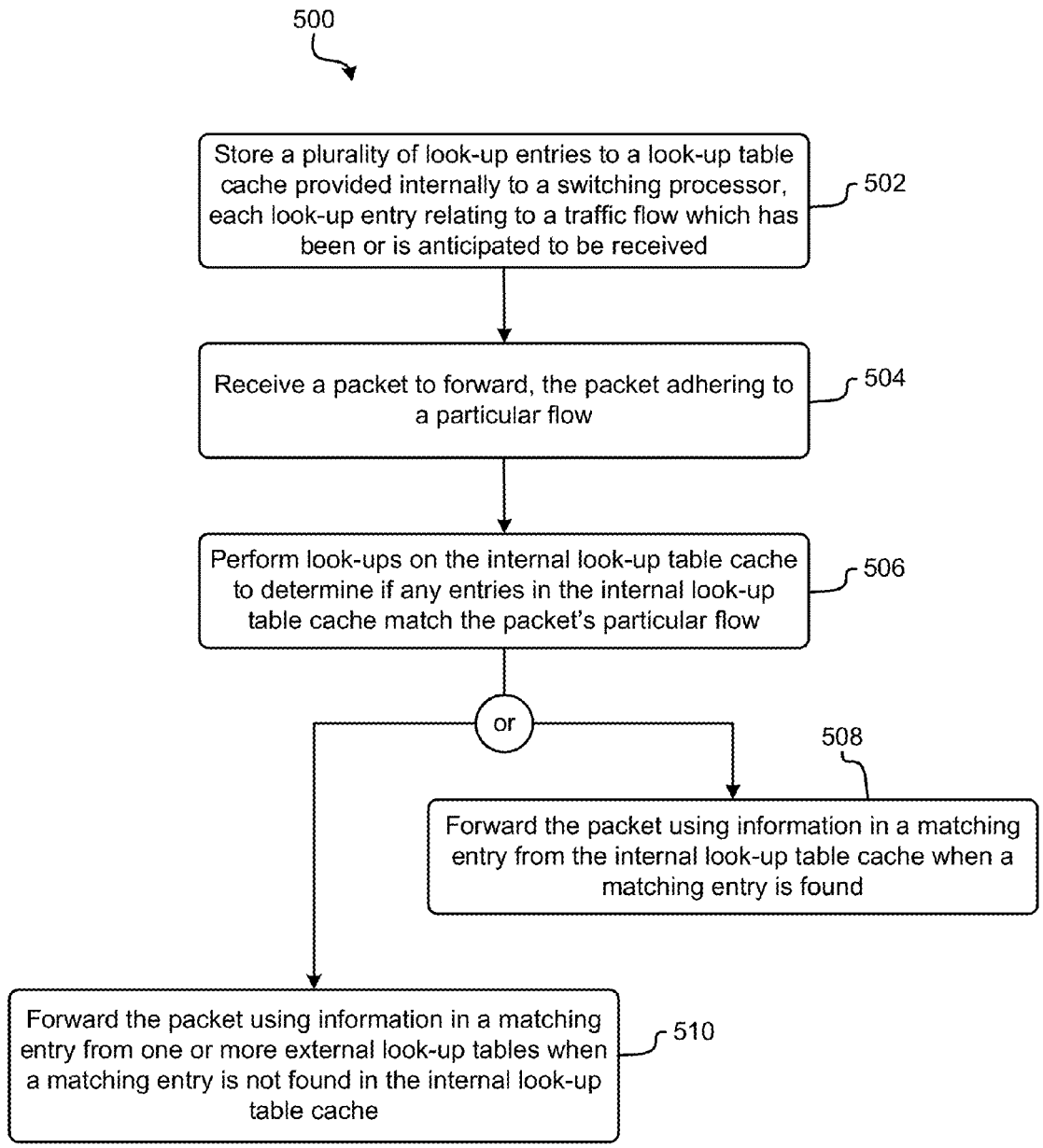
FIG. 5 is a flowchart of a method, according to another embodiment.

Now referring to FIG. 5, a flowchart of a method 500 for using an internal look-up table cache is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a switching processor (such as a CPU, an ASIC, an FPGA, etc.), a module, a function block, etc., in various approaches.

As shown in FIG. 5, method 500 may initiate with operation 502, where a plurality of look-up entries are stored to a look-up table cache provided internally to a switching processor. Each look-up entry relates to a traffic flow which has been or is anticipated to be received.

In operation 504, a packet to forward is received. The packet adheres to a particular flow, which may or may not be described in an entry in the internal look-up table cache.

In operation 506, look-ups on the internal look-up table cache are performed in order to determine if any entries in the internal look-up table cache match the packet's particular flow.

In operation 508, the packet is forwarded using information in a matching entry from the internal look-up table cache when a matching entry is found.

Otherwise, in operation 510, the packet is forwarded using information in an entry from one or more external look-up tables when a matching entry is not found in the internal look-up table cache.

In some further embodiments, the method 500 may include performing pre-classification of packets in a buffer memory, creating one or more look-up requests for searching the internal look-up table cache, processing the packet according to details included in the matching entry from the internal look-up table cache, performing egress packet processing for one or more functionalities, initializing and managing the internal look-up table cache, handling internal look-up table cache misses and page faults, algorithmically bringing new blocks of look-up entries from the one or more external look-up tables into the internal look-up table cache, initializing and managing the one or more external look-up tables, and/or performing pre-fetching operations in order to reduce an amount of time used to forward the packet.

In more approaches, the internal look-up table cache may be organized into at least three segments: a persistent flows entries segment, a non-persistent flows entries segment, and an ACL segment, wherein each segment comprises a plurality of entries relating to the segment type.

In another embodiment, the method 500 may include matching a width of the internal look-up table cache to a size of entries to be stored therein.

According to another embodiment, a computer program product for using an internal look-up table cache may comprise a computer readable storage medium (of a type described herein or as known to one of skill in the art, including non-transitory mediums) having computer readable program code embodied therewith. The computer readable program code comprises computer readable program code configured for storing a plurality of look-up entries to a look-up table cache provided internally to a switching processor, each look-up entry relating to a traffic flow which has been or is anticipated to be received, computer readable program code configured for receiving a packet to forward, the packet adhering to a particular flow, computer readable program code configured for performing look-ups on the internal look-up table cache to determine if any entries in the internal look-up table cache match the packet's particular flow, computer readable program code configured for forwarding the packet using information in a matching entry from the internal look-up table cache when a matching entry is found, and computer readable program code configured for forwarding the packet using information in an entry from one or more external look-up tables when a matching entry is not found in the internal look-up table cache.

In a further embodiment, the computer program product may include computer readable program code configured for performing pre-classification of packets in a buffer memory, computer readable program code configured for creating one or more look-up requests for searching the internal look-up table cache, computer readable program code configured for processing the packet according to details included in the matching entry from the internal look-up table cache, and computer readable program code configured for performing egress packet processing for one or more functionalities.

According to another embodiment, the computer program product may include computer readable program code configured for initializing and managing the internal look-up table cache, computer readable program code configured for handling internal look-up table cache misses and page faults, and computer readable program code configured for algorithmically bringing new blocks of look-up entries from the one or more external look-up tables into the internal look-up table cache.

In yet another embodiment, the computer program product may include computer readable program code configured for initializing and managing the one or more external look-up tables, computer readable program code configured for performing pre-fetching operations in order to reduce an amount of time used to forward the packet, and computer readable program code configured for matching a width of the internal look-up table cache to a size of entries to be stored therein.

According to another embodiment, the internal look-up table cache may be organized into at least three segments: a persistent flows entries segment, a non-persistent flows entries segment, and an ACL segment, wherein each segment comprises a plurality of entries relating to the segment type.

In another embodiment, a system may comprise a plurality of ports adapted for connecting to external devices, a switching processor having a packet processor, which includes: a LIFRL module and a PPL module, wherein the LIFRL module and the PPL module are adapted to operate in parallel, an internal look-up table cache comprising a plurality of look-up entries, each look-up entry relating to a traffic flow which has been or is anticipated to be received by the switching processor, wherein the LIFRL module is adapted for accessing the internal look-up table cache, and a traffic manager module comprising a buffer memory, the traffic manager module being connected to the plurality of ports. The PPL module is adapted for communicating with the traffic manager module and the buffer memory, and the LIFRL module is adapted for communicating with one or more external look-up tables.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a switching processor, comprising:
   a packet processor, comprising:
   a look-up interface, fetch and refresh logic (LIFRL) module; and
   a packet processor logic (PPL) module, wherein the LIFRL module and the PPL module are configured to operate in parallel; and
   an internal look-up table cache comprising a plurality of look-up entries, each look-up entry relating to a traffic flow which has been or is anticipated to be received by the switching processor,
   wherein the LIFRL module is configured to access the internal look-up table cache and one or more external look-up tables.

2. The system as recited in claim 1, further comprising a plurality of ports configured to connect to external devices, wherein the switching processor further comprises a traffic manager module comprising a buffer memory, the traffic manager module being connected to the plurality of ports, and wherein the PPL module is configured for communicating with the traffic manager module and the buffer memory.

3. The system as recited in claim 2, wherein the PPL module comprises:
   logic configured to perform pre-classification of packets in the buffer memory;
   logic configured to create one or more look-up requests;
   logic configured to send the one or more look-up requests to the LIFRL module;
   logic configured to receive one or more look-up responses back from the LIFRL module;
   logic configured to process a packet per details included in the one or more look-up responses; and
   logic configured to perform egress packet processing for one or more functionalities.

4. The system as recited in claim 1, wherein the LIFRL module comprises:
   logic configured to interact with the PPL module for all look-up requests and responses;
   logic configured to follow a predefined format of the requests and responses;
   logic configured to initialize and manage the internal look-up table cache;
   logic configured to follow a preferred cache configuration;
   logic configured to perform look-ups on the internal look-up table cache to determine packet forwarding decisions;
   logic configured to handle cache misses and page faults; and
   logic configured to algorithmically bring new blocks of look-up entries from the one or more external look-up tables into the internal look-up table cache.

5. The system as recited in claim 4, wherein the logic configured to initialize and manage the internal look-up table cache comprises logic configured to refresh entries in the internal look-up table cache according to an algorithmic calculation to increase an efficiency of the switching processor.

6. The system as recited in claim 1, wherein the LIFRL module comprises at least one of:
   logic configured to initialize and manage the one or more external look-up tables; and logic configured to perform pre-fetching operations in order to optimize performance of the switching processor.

7. The system as recited in claim 1, wherein the internal look-up table cache is organized into at least three segments: a persistent flows entries segment, a non-persistent flows entries segment, and an access control list (ACL) segment, wherein each segment comprises a plurality of entries relating to a segment type.

8. The system as recited in claim 1, wherein a width of the internal look-up table cache is matched to a size of entries to be stored therein.

9. A system, comprising:
   an internal look-up table cache comprising a plurality of look-up entries, each look-up entry relating to a traffic flow which has been or is anticipated to be received by the system; and
   a look-up interface, fetch and refresh logic (LIFRL) module configured to access the internal look-up table cache and one or more external look-up tables.

10. The system as recited in claim 9, wherein the LIFRL module comprises at least one of:
   logic configured to initialize and manage the one or more external look-up tables; and
   logic configured to perform pre-fetching operations in order to optimize performance of a packet processor logic (PPL) module.

11. The system as recited in claim 10, wherein the PPL module comprises:
   logic configured to create one or more look-up requests;
   logic configured to send the one or more look-up requests to the LIFRL module;
   logic configured to receive one or more look-up responses back from the LIFRL module;
   logic configured to process a packet per details included in the one or more look-up responses; and
   logic configured to perform egress packet processing for one or more functionalities.

12. The system as recited in claim 9, wherein the LIFRL module further comprises:
   logic configured to interact with a packet processor logic (PPL) module for all look-up requests and responses;
   logic configured to follow a predefined format of the requests and responses;
   logic configured to initialize and manage the internal look-up table cache;
   logic configured to follow a preferred cache configuration;
   logic configured to perform look-ups on the internal look-up table cache to determine packet forwarding decisions; and
   logic configured to handle cache misses and page faults.

13. The system as recited in claim 12, wherein the logic configured to initialize and manage the internal look-up table cache comprises logic configured to refresh entries in the internal look-up table cache according to an algorithmic calculation to increase an efficiency of the PPL.

14. The system as recited in claim 9, wherein the LIFRL module further comprises logic configured to algorithmically bring new blocks of look-up entries from the one or more external look-up tables into the internal look-up table cache.

15. A computer program product comprising a non-transitory computer readable storage medium having computer readable program code embodied therewith, the embodied computer readable program code comprising:
   computer readable program code configured to initialize an internal look-up table cache provided internally to a switching processor, the internal look-up table cache being configured to store a plurality of look-up entries, wherein the internal look-up table cache is organized into at least three segments: a persistent flows entries segment, a non-persistent flows entries segment, and an access control list (ACL) segment, and wherein each look-up entry relates to a traffic flow which has been or is anticipated to be received by a switching processor configured to access the internal look-up table cache; and
   computer readable program code configured to manage the internal look-up table cache to store entries relating to a particular segment type into a corresponding segment of the internal look-up table cache.

16. The computer program product as recited in claim 15, wherein the embodied computer readable program code further comprises computer readable program code configured to initialize and manage one or more external look-up tables.

17. The computer program product as recited in claim 15, wherein the embodied computer readable program code further comprises computer readable program code configured to match a width of the internal look-up table cache to a size of entries to be stored therein.

18. The computer program product as recited in claim 15, wherein the persistent flows entries segment is configured to store look-up entries relating to longer lasting flows as compared to flows associated with look-up entries stored in the non-persistent flows entries segment, and wherein at least one of a timer and an activity bit is associated with each look-up entry in the persistent flows entries segment.

19. The computer program product as recited in claim 15, wherein the non-persistent flows entries segment is configured to store look-up entries relating to shorter lasting flows as compared to flows associated with look-up entries stored in the persistent flows entries segment, and wherein the non-persistent flows entries segment is larger than the persistent flows entries segment.

20. The computer program product as recited in claim 15, wherein the ACL segment is configured to store one or more ACLs, each ACL being related to a traffic flow which has been or is anticipated to be received by the switching processor, and wherein the entries in the ACL segment are loaded at start-up time.

* * * * *